United States Patent
Koster et al.

(10) Patent No.: US 9,794,287 B1
(45) Date of Patent: *Oct. 17, 2017

(54) IMPLEMENTING CLOUD BASED MALWARE CONTAINER PROTECTION

(71) Applicant: International Business Machines Corporation, Armonk, NY (US)

(72) Inventors: David M. Koster, Rochester, MN (US); Jason A. Nikolai, Rochester, MN (US); Adam D. Reznechek, Rochester, MN (US); Andrew T. Thorstensen, Morrisville, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/339,353

(22) Filed: Oct. 31, 2016

(51) Int. Cl.
*H04L 29/06* (2006.01)

(52) U.S. Cl.
CPC ...... *H04L 63/1491* (2013.01); *H04L 63/1416* (2013.01); *H04L 63/1425* (2013.01)

(58) Field of Classification Search
CPC ........ G06F 21/53; G06F 21/56; G06F 21/564; G06F 21/566; G06F 21/568; G06F 2009/4557; G06F 2009/45562; G06F 2009/45587; G06F 9/45558; G06F 3/0647; H04L 63/1441
USPC ......................................................... 726/23
See application file for complete search history.

(56) References Cited

U.S. PATENT DOCUMENTS

| | | | |
|---|---|---|---|
| 8,918,881 B2 | 12/2014 | Bettini et al. | |
| 8,966,632 B1* | 2/2015 | Huang | G06F 21/53 713/183 |
| 9,246,904 B2 | 1/2016 | Rajagopal et al. | |
| 2011/0107424 A1* | 5/2011 | Singh | G06F 17/30109 726/24 |
| 2011/0173698 A1* | 7/2011 | Polyakov | G06F 11/0748 726/23 |
| 2014/0283071 A1 | 9/2014 | Spikes | |

OTHER PUBLICATIONS

Madhavapeddy (2015). Jitsu: Just-In-Time Summoning of Unikernels, 12th USENIX Symposium on Networked Systems Design and Implementation. Retrieved Jan. 22, 2017 from https://www.usenix.org/system/files/conference/nsdi15/nsdi15-paper-madhavapeddy.pdf.*

Zhao (2009). Defend Against Denial of Service Attack with VMM, 2009 Eighth International Conference on Grid and Cooperative Computing. Retrieved Jan. 22, 2017 from http://ieeexplore.ieee.org/stamp/stamp.jsp?arnumber=5280109&tag=1.*

Awan (Jul. 16, 2016). A Review of Container Types—Part 2. Retrieved Feb. 21, 2017 from https://medium.com/@asif_awan/a-review-of-container-types-part-2-33c7a17686ba#.wi367d92n.*

Anonymously; "System and Method for Providing Clientless Fraud Protection as a Service"; http://ip.com/IPCOM/000244673D; Jan. 6, 2016.

(Continued)

*Primary Examiner* — Brian F Shaw
(74) *Attorney, Agent, or Firm* — Joan Pennington

(57) ABSTRACT

A method, and a system are provided for implementing cloud based malware container protection. A container is provisioned for a user. The container is monitored, and when an abnormal activity is detected based upon historical metric data, a unikernel is provisioned and a user application is migrated to the unikernel while inspection occurs.

18 Claims, 3 Drawing Sheets

(56) References Cited

OTHER PUBLICATIONS

IBM; "Method and apparatus for optimally combining different malware detectors"; http://ip.com/IPCOM/000187486D; Sep. 8, 2009.
Zeltser, "Security Risks and Benefits of Docker Application Containers," Dec. 1, 2015 https://zeltser.com/security-risks-and-benefits-of-docker-application/.
"Moving an existing install into (or out of) a virtual machine," from Arch Wiki, Aug. 26, 2016 https://wiki.archlinux.org/index.php/Moving_an_existing_install_into_%28or_out_of%29_a_virtual_machine.
"How to migrate a container to a virtual machine?", Article ID: 117955, Oct. 14, 2013 http://kb.odin.com/en/117955.
Timme, "How to Do Live Migration of OpenVZ Containers," 2006 https://www.howtoforge.com/how-to-do-live-migration-of-openvz-containers.
Garfield et al., "A Virtual Machine Introspection Based Architecture for Intrusion Detection", 2002 http://www.isoc.org/isoc/conferences/ndss/03/proceedings/papers/13.pdf.

\* cited by examiner

IMPLEMENTING CLOUD BASED MALWARE CONTAINER PROTECTION

FIELD OF THE INVENTION

The present invention relates generally to the data processing field, and more particularly, relates to a method and computer system for implementing cloud based malware container protection.

DESCRIPTION OF THE RELATED ART

The use of containers, for example, Docker, currently is popular for rapid provisioning within clusters and cloud environments. Docker is an open platform container for developers and system administrators to build, ship, and run distributed applications. However, there are concerns over the security aspects of known containers. A container shares parts of a kernel in order to gain speed in provisioning, and the like. Given the number of attacks by cyber criminals, containers are not always the right solution.

A need exists to maintain the performance gains from containers while providing a mechanism for isolation when anomalous events occur by a user without shutting down the user completely when false detection occurs. False positives can result in blacklisting or shutting down users who have done nothing wrong which can result in lost customers, revenue, and the like.

A need exists for an effective mechanism to implement cloud based malware container protection.

SUMMARY OF THE INVENTION

Principal aspects of the present invention are to provide a method, and a system for implementing cloud based malware container protection. Other important aspects of the present invention are to provide such method, and system substantially without negative effects and that overcome some of the disadvantages of prior art arrangements.

In brief, a method, and a system are provided for implementing cloud based malware container protection. A container is provisioned for a user. The container is monitored, and when an abnormal activity is detected based upon historical metric data, a unikernel is provisioned and the application by the user is migrated to the unikernel while inspection occurs.

In accordance with features of the invention, the unikernel is an operating environment that does not have the full function of an operating system, while the unikernel supports running a container environment.

In accordance with features of the invention, potentially bad clients are detected and migrated to an isolated zone while inspection occurs. Using the unikernel the user will see a minimal outage, if any, and can continue working while the multi-container environment remains secure for the other users.

In accordance with features of the invention, false positives will not result in black listing users or cause long outages for these users. An additional layer of security is provided for containers and the suspect container is preserved for future forensic analysis. If the activity was caused by an attacker, the forensic data advantageously is used for investigation, prosecution, and to build better controls in the container environment.

BRIEF DESCRIPTION OF THE DRAWINGS

The present invention together with the above and other objects and advantages may best be understood from the following detailed description of the preferred embodiments of the invention illustrated in the drawings, wherein.

DETAILED DESCRIPTION OF THE PREFERRED EMBODIMENTS

In the following detailed description of embodiments of the invention, reference is made to the accompanying drawings, which illustrate example embodiments by which the invention may be practiced. It is to be understood that other embodiments may be utilized and structural changes may be made without departing from the scope of the invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

In accordance with features of the invention, a method, and a system are provided for implementing cloud based malware container protection. A container is provisioned for a user for the user to use a service in a cloud environment. The container is monitored, and when an abnormal activity is detected based upon historical metric data, a unikernel is provisioned and the application by the user is migrated to the unikernel while inspection occurs.

Figure 1:
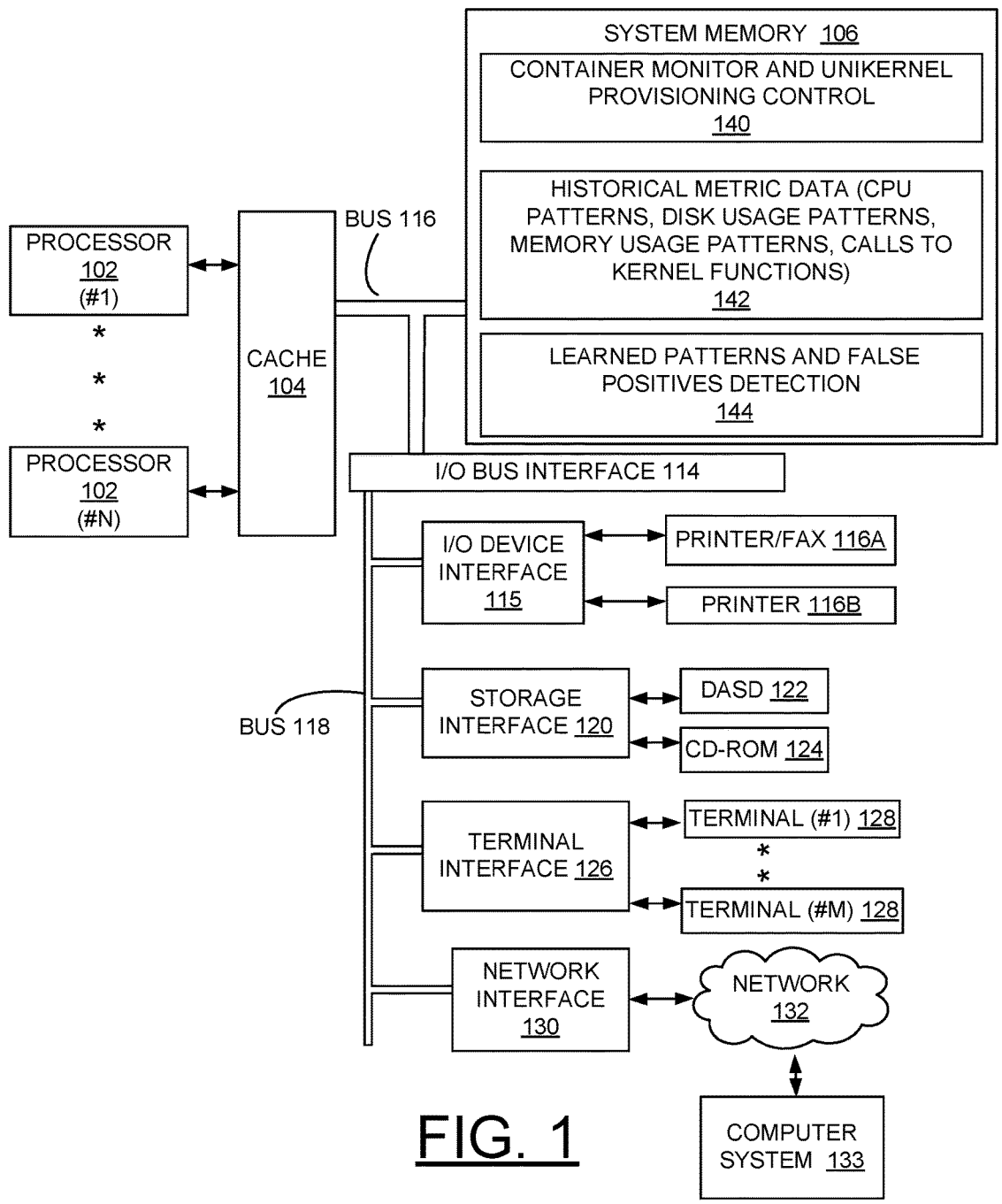
FIG. 1 illustrates an example computer system for implementing cloud based malware container protection in accordance with preferred embodiments.

Having reference now to the drawings, in FIG. 1, there is shown an example computer system generally designated by the reference character 100 for implementing cloud based malware container protection in accordance with preferred embodiments. Computer system 100 includes one or more processors 102 or general-purpose programmable central processing units (CPUs) 102, #1-N. As shown, computer system 100 includes multiple processors 102 typical of a relatively large system; however, system 100 can include a single CPU 102. Computer system 100 includes a cache memory 104 connected to each processor 102.

Computer system 100 includes a memory system 106 connected to bus 116. Memory system 106 includes a random-access semiconductor memory for storing data, including programs. Memory system 106 is comprised of, for example, a dynamic random access memory (DRAM), a synchronous direct random access memory (SDRAM), a current double data rate (DDRx) SDRAM, non-volatile memory, optical storage, and other storage devices.

I/O bus interface 114, and buses 116, 118 provide communication paths among the various system components. Bus 116 is a processor/memory bus, often referred to as front-side bus, providing a data communication path for transferring data among CPUs 102 and caches 104, memory controller 108 and I/O bus interface unit 114. I/O bus interface 114 is further coupled to system I/O bus 118 for transferring data to and from various I/O units.

As shown, computer system 100 includes an I/O device interface 115 coupled to I/O devices, such as a first printer/fax 116A, and a second printer 116B, a storage interface 120 coupled to storage devices, such as, a direct access storage device (DASD) 122, and a CD-ROM 124. Computer system 100 includes a terminal interface 126 coupled to a plurality of terminals 128, #1-M, and a network interface 130 coupled to a network 132, such as the Internet, local area or other networks. Network 132 is coupled to one or more computer systems 133.

I/O bus interface 114 communicates with multiple I/O interface units 114, 120, 126, and 130, which are also known as I/O processors (IOPs) or I/O adapters (IOAs), through system I/O bus 116. System I/O bus 116 is, for example, an industry standard PCI bus, or other appropriate bus technology.

Memory system 106 includes a container monitor and unikernel provisioning control 140 in accordance with preferred embodiments. Memory system 106 stores historical metric data 142, and learned patterns and false positives detection data in accordance with preferred embodiments.

In accordance with features of the invention, the historical metric data 142 used and built in accordance with preferred embodiments includes CPU patterns, disk usage patterns, memory usage patterns, calls to kernel function patterns.

In accordance with features of the invention, a combination of containers and unikernels are used to provide intrusion prevention and incident response. By using a unikernel, the tenant or user is kept up and running. Historically, when an anomaly is detected, the tenant is shutdown and false positives result in customer impact and lost revenue.

In accordance with features of the invention, learning of usage patterns for containers is provided based on a custom cloud environment. Over time, historical data reveals common patterns for activities. These patterns advantageously are used to predict and prevent malicious activities.

Computer system 100 is shown in simplified form sufficient for understanding the present invention. The illustrated computer system 100 is not intended to imply architectural or functional limitations. Although main memory 110 of main memory system 106 is represented conceptually in FIG. 1 as a single entity, it will be understood that in fact the main memory is more complex. For example, main memory system 106 comprises multiple modules and components. The present invention can be used with various hardware implementations and systems and various other internal hardware devices.

Figure 2:
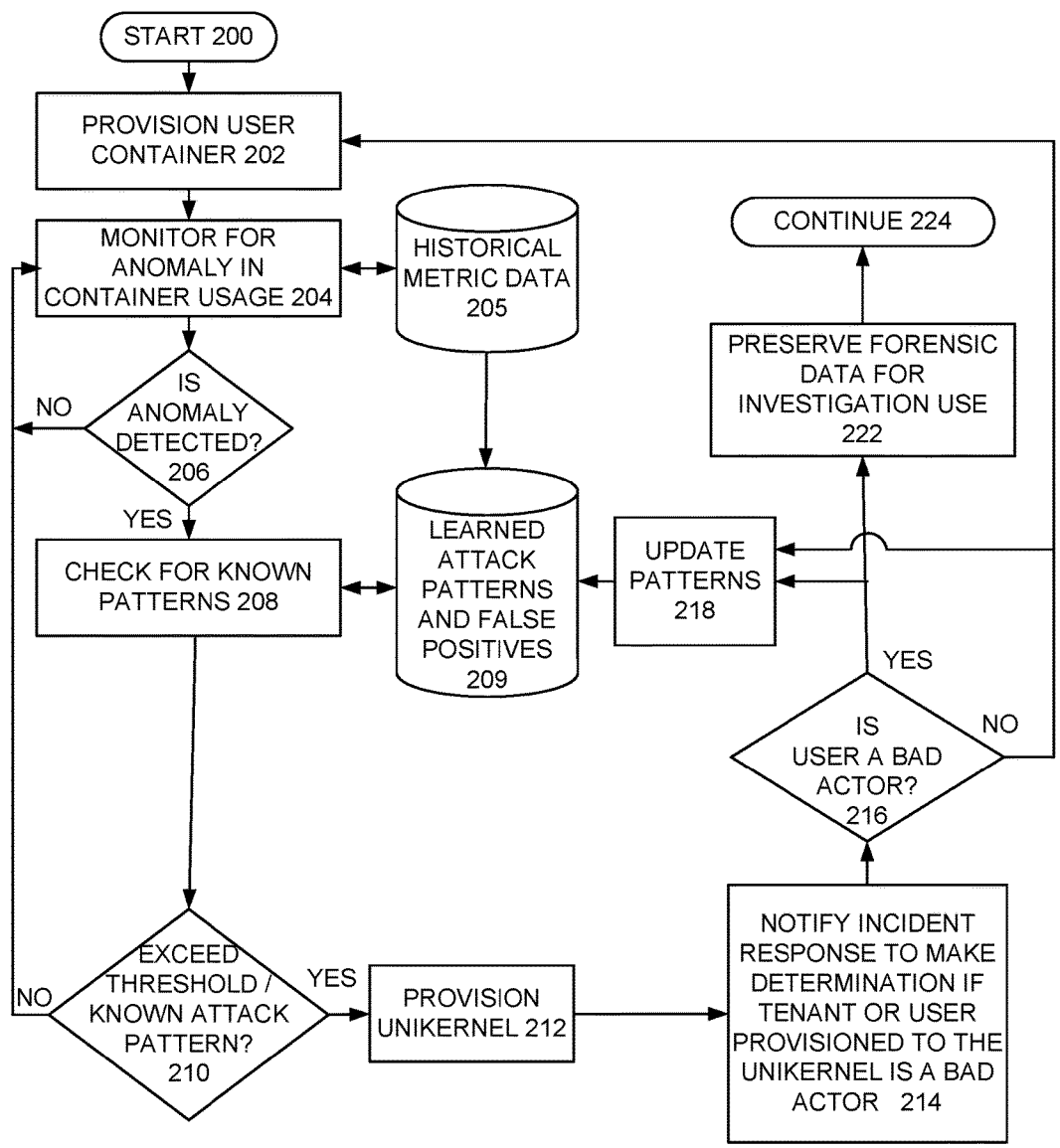
FIG. 2 is a flow chart illustrating example operations for implementing cloud based malware container protection in the computer system of FIG. 1 in accordance with preferred embodiments.

Referring also to FIG. 2, there are shown example operations for implementing cloud based malware container protection in accordance with preferred embodiments starting at a block 200. As indicated at a block 202, when cloud tenant wishes to use a service in the cloud environment, a container, such as a Docker container or the like is provisioned to lightly isolate the tenant from other tenants, while in a rapid fashion and allow sharing of core operating system resource. As indicated at a block 204, container usage is monitored and used to build historical metric data indicated at a block 205. For example, CPU patterns, disk usage patterns, memory usage patterns, calls to kernel function patterns is monitored at block 204 where data is sampled periodically. Then it is compared with existing data using data mining techniques for anomaly detection against usage patterns.

As indicated at a decision block 206, checking for an anomaly or abnormal activity is performed. Introspection optionally is used to monitor container metrics, such as kernel API calls, looking for abnormal patterns. The monitored container data is compared with existing data using data mining techniques for anomaly detection against usage patterns at decision block 206, and checking for known pattern is performed as indicated at a block 208. When an abnormal activity is detected, for example, based on a threshold that gets smarter over the lifetime of the system, an anomaly flag is set to true at decision block 206. At block 208, the abnormal pattern is checked against known patterns. If the pattern is known to not be an attack, it is ignored. If the pattern is a known pattern for bad actor activity, it is flagged as an attack. This technique involves machine learning and categorization. One example is through the use of a Naive Bayes classifier. As indicated at a block 209, learned attack patterns and false positives are stored. As indicated at a decision block 210, checking is performed to determine whether a threshold is exceeded or if a known attack pattern.

If the threshold is exceeded or if a known attack pattern, then container is removed from the multi-tenant container pool and rapidly provisioned as a unikernel as indicated at a block 212. The removal and unikernel provisioning operations at block 212 isolate the tenant or user from other tenants while not allowing the user to wreak havoc, for example, attack other tenants and cause system harm, while preserving the forensic data and keeping the tenant running in the case the anomaly was a false positive. If the threshold is not exceeded, or not a known attack patterns, operations continue returning to block 204.

As indicated at a block 214, an incident response procedure or response team is notified to make the determination whether or not the tenant that was provisioned to the unikernel was indeed a bad actor. Events that occurred and the logs are reviewed to determine whether the user is malicious. As indicated at a decision block 216, checking if the user is a bad actor is performed. As indicated at a block 218, the pattern is defined and added to the detection algorithm and trained into the model of learned attack patterns and false positives at block 209.

When the user is a bad actor, forensic data is preserved for investigation use as indicated at a block 222. If not, the tenant is put back into the standard container pool returning to block 202. After preserving forensic data for investigation use at block 222, operations continue as indicated at a block 224.

Figure 3:
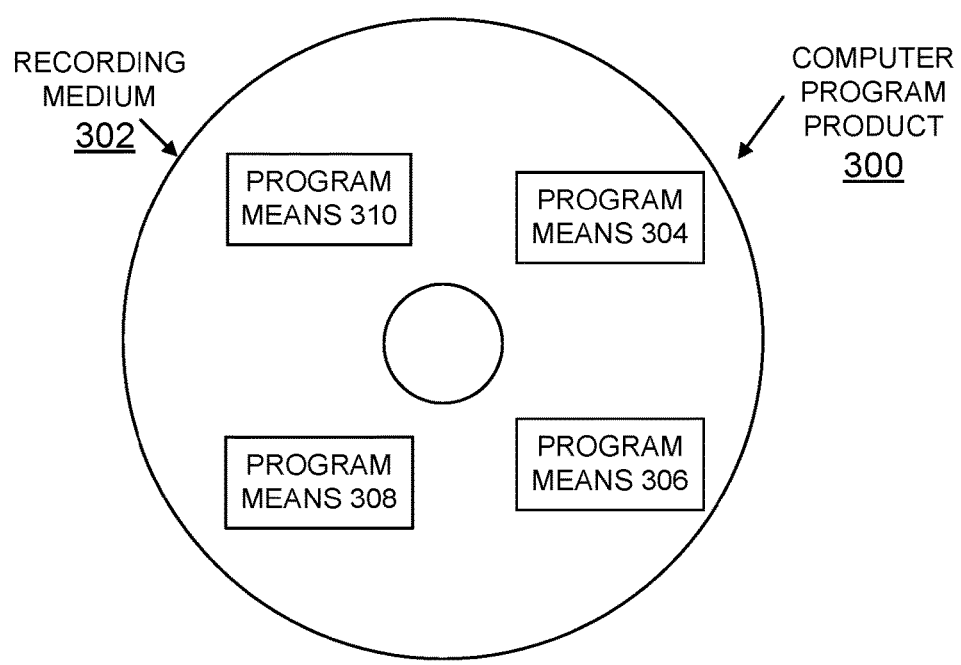
FIG. 3 is a block diagram illustrating a computer program product in accordance with the preferred embodiment.

Referring now to FIG. 3, an article of manufacture or a computer program product 300 of the invention is illustrated. The computer program product 300 is tangibly embodied on a non-transitory computer readable storage medium that includes a recording medium 302, such as, a floppy disk, a high capacity read only memory in the form of an optically read compact disk or CD-ROM, a tape, or another similar computer program product. Recording medium 302 stores program means 304, 306, 308, and 310 on the medium 302 for carrying out the methods for implementing cloud based malware container protection in computer system 100 in accordance with preferred embodiments.

A sequence of program instructions or a logical assembly of one or more interrelated modules defined by the recorded program means 304, 306, 308, and 310, direct the memory subsystem 200 for implementing cloud based malware container protection of the preferred embodiments.

While the present invention has been described with reference to the details of the embodiments of the invention shown in the drawing, these details are not intended to limit the scope of the invention as claimed in the appended claims.

What is claimed is:

1. A method for implementing cloud based malware container protection in a computer system comprising:
   provisioning a container for a user and sharing a kernel for the provisioned user container with other provisioned user containers;
   monitoring of container metrics for the container to detect an abnormal activity by the user; and
   responsive to detecting abnormal activity, provisioning a unikernel and migrating a user application by the user to the provisioned unikernel providing an isolated zone while inspection occurs; said provisioned unikernel comprising a container environment running the migrated user application with the user using the provisioned unikernel seeing at most a migrated user application outage that does not affect the user using the migrated user application, while the other provisioned user containers remain secure; and
   responsive to identifying a false positive for the detected abnormal activity, provisioning a different user container for the user of the migrated user application and sharing the kernel for the different provisioned user container with other provisioned user containers.

2. The method as recited in claim 1 includes using and building historical metric data to detect the abnormal activity.

3. The method as recited in claim 1 wherein monitoring container metrics include monitoring at least one of CPU patterns, disk usage patterns, memory usage patterns, and calls to kernel function patterns.

4. The method as recited in claim 1 includes storing and using historical metric data for anomaly detection against usage patterns.

5. The method as recited in claim 1 includes storing and checking learned attack patterns for detecting abnormal activity.

6. The method as recited in claim 1 includes storing the false positive for the detected abnormal activity with stored learned attack patterns.

7. The method as recited in claim 1 includes responsive to identifying an attacker causing the detected abnormal activity, storing forensic data for investigation use.

8. The method as recited in claim 1 wherein provisioning the container for the user includes sharing said kernel for the provisioned user container with other provisioned user containers while the multiple containers remain secure.

9. A computer system for implementing cloud based malware container protection comprising:
   a processor;
   a container monitor and unikernel provisioning control;
   said processor using said container monitor and unikernel provisioning control performs:
   provisioning a container for a user and sharing a kernel for the provisioned user container with other provisioned user containers;
   monitoring of container metrics for the container to detect an abnormal activity by the user; and
   responsive to detecting abnormal activity, provisioning a unikernel and migrating an application by the user to the provisioned unikernel providing an isolated zone while inspection occurs; and said provisioned unikernel comprising a container environment running the migrated user application with the user of the provisioned unikernel seeing at most a migrated user application outage that does not affect the user using the migrated user application, while the other provisioned user containers remain secure; and
   responsive to identifying a false positive for the detected abnormal activity, provisioning a different user container for the user of the migrated user application and sharing the kernel for the different provisioned user container with other provisioned user containers.

10. The computer system as recited in claim 9, includes control code stored on a non-transitory computer readable medium, and wherein said processor uses said control code to implement cloud based malware container protection.

11. The computer system as recited in claim 9 includes said processor using and building historical metric data to detect abnormal activity.

12. The computer system as recited in claim 9 wherein said processor monitoring container metrics includes monitoring at least one of CPU patterns, disk usage patterns, memory usage patterns, and calls to kernel function patterns.

13. The computer system as recited in claim 9 includes said processor storing and checking learned attack patterns for detecting abnormal activity.

14. The computer system as recited in claim 9 wherein said processor provisioning the different container for the user includes sharing said kernel for the different provisioned user container with other provisioned user containers while the multiple containers remain secure.

15. The computer system as recited in claim 9 includes said processor responsive to identifying an attacker causing the detected abnormal activity, storing forensic data for investigation use.

16. The computer system as recited in claim 9 includes said processor storing the false positive with stored learned attack patterns.

17. The computer system as recited in claim 9 includes said processor storing and using historical metric data for anomaly detection against usage patterns.

18. The computer system as recited in claim 9 includes said processor storing and checking learned attack patterns for detecting abnormal activity.

* * * * *